United States Patent
Bianco

[19]

[11] Patent Number: 5,965,185
[45] Date of Patent: Oct. 12, 1999

[54] TRANSPORTABLE AND SIZE-ADJUSTABLE APPARATUS WITH MULTIPLE AIR FLOW CONTROL UNITS FOR RIPENING OF FRESH PRODUCE

[75] Inventor: Michael Bianco, Palm Beach Gardens, Fla.

[73] Assignee: Cool Care, Ltd., Deerfield Beach, Fla.

[21] Appl. No.: 08/886,878

[22] Filed: Jul. 2, 1997

Related U.S. Application Data

[63] Continuation-in-part of application No. 08/638,905, Apr. 24, 1996, Pat. No. 5,789,007.

[51] Int. Cl.[6] .............................. A23K 3/00; A23B 4/06
[52] U.S. Cl. .............................. 426/449; 62/78; 62/239; 62/419; 99/474; 99/475; 426/263; 44/90; 44/174
[58] Field of Search .............................. 62/78, 237, 239, 62/414, 419; 99/467, 468, 472–476; 426/263, 312, 418, 419; 454/118, 174, 90

[56] References Cited

U.S. PATENT DOCUMENTS

| | | | |
|---|---|---|---|
| 880,414 | 2/1908 | Sprague | 426/418 |
| 4,824,685 | 4/1989 | Bianco | 426/418 |
| 5,373,780 | 12/1994 | Bianco | 99/475 |
| 5,475,926 | 12/1995 | Bolkenstein et al. | 426/418 |
| 5,531,158 | 7/1996 | Perryman | 99/467 |
| 5,658,607 | 8/1997 | Herdeman | 426/263 |
| 5,706,662 | 1/1998 | Van | 62/239 |
| 5,778,557 | 7/1998 | Leavens | 99/474 |
| 5,789,007 | 8/1998 | Bianco | 426/419 |

*Primary Examiner*—Joseph W. Drodge
*Attorney, Agent, or Firm*—Kenyon & Kenyon

[57] ABSTRACT

A transportable and size-adjustable ripening apparatus for controlled ripening of produce includes a chamber defined by a ceiling, a floor, and walls connecting the ceiling and the floor. The chamber is configured to receive a row of boxed produce that defines an interstitial volume with one of the walls to create a low-pressure plenum. The ripening apparatus also includes an air flow control system for transferring air between a high pressure plenum and the low pressure plenum, and which controls the temperature of the transferred air. The plena are generally enclosed to inhibit airflow therebetween except for airflow through the air control system and through openings in the produce boxes. The air control system includes one system for controlling the flow of air through a refrigeration unit, and another system for circulating air without refrigeration. The invention is preferably constructed from an existing ISO (International Standards Organization) container. The container may be mounted on a chassis with wheels, to thereby be transportable.

31 Claims, 4 Drawing Sheets

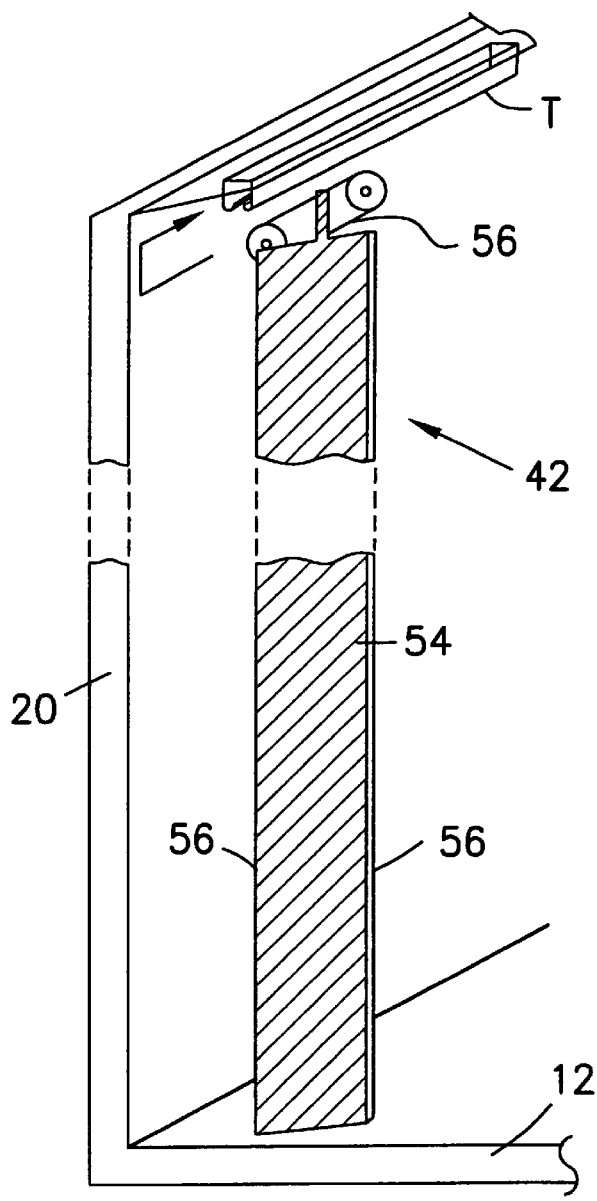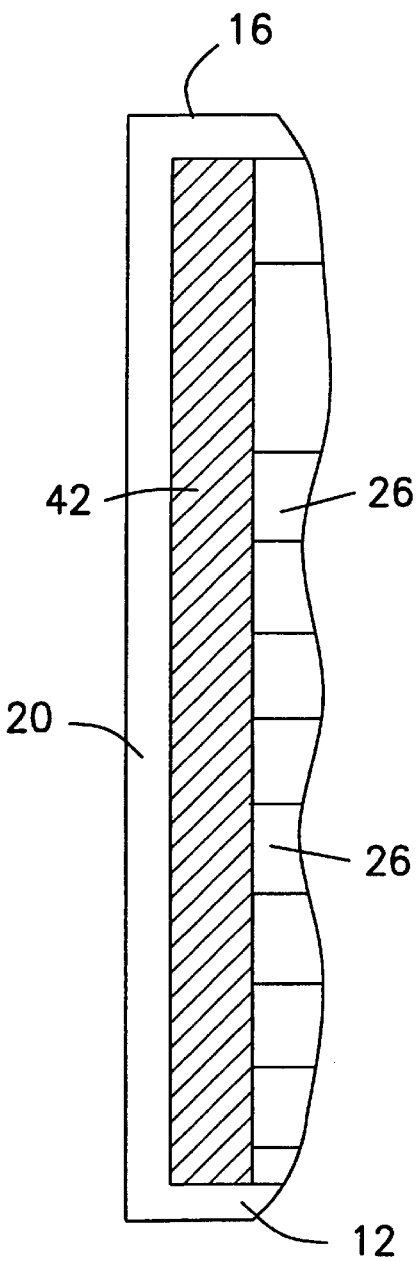
FIG. 4
FIG. 7

TRANSPORTABLE AND SIZE-ADJUSTABLE APPARATUS WITH MULTIPLE AIR FLOW CONTROL UNITS FOR RIPENING OF FRESH PRODUCE

This application is a continuation-in-part of U.S. patent application Ser. No. 08/638,905 filed Apr. 24, 1996 now U.S. Pat. No. 5,789,007, issued Aug. 4, 1998.

FIELD OF THE INVENTION

The present invention relates generally to a transportable and size-adjustable apparatus with multiple air flow control units, for controlled ripening of fresh produce, particularly bananas.

BACKGROUND OF THE INVENTION

Bananas and other fresh produce are typically transported from growing fields to a processing facility where they are placed in specially designed ripening rooms within a building. These ripening rooms are provided with insulated, gas-tight wall and roof panels and include an air handling unit to control the circulation and temperature of the air within the ripening room. In this manner, the ripening of the fresh produce is controlled in accordance with a predetermined ripening schedule so that the fruit is properly ripened at the time it is scheduled for delivery to retail outlets. Ethylene gas may be dispersed into the ripening room at preselected times to enable further control of the ripening of the produce. The use of ripening rooms thereby facilitates the later delivery of produce to retail outlets without the constraint of having to schedule delivery in accordance with the natural ripening process of the fruit. Use of ripening rooms also further obviates problems associated with accelerations and decelerations of the ripening process due to changing conditions during the transportation of the produce.

U.S. Pat. Nos. 4,824,685 and 5,373,780 disclose ripening rooms in which the produce is packed into unitized shipping modules including individual protective boxes that are block-stacked on pallets. The palletized produce is placed into ripening rooms having a floor, ceiling and front, rear and side walls of suitable dimensions to enclose two spaced rows of the palletized produce. The two rows are spaced apart from one another to define an interstitial volume between the rows. Sufficient spacing is also provided between the palletized produce and the ceiling and walls of the chamber to define an airspace around and above the produce.

In the patents described above, a tarp is placed over the top and one end of the spacing between the two rows of palletized produce to generally seal off the interstitial volume from the airspace around and above the produce. Exhaust fans are arranged in a sealed relation at the opposite end of the spacing between the rows to withdraw air from the interstitial volume and thereby create a pressure differential between the tarp-sealed interstitial volume and the airspace above and around the produce. Air is introduced into the airspace by an air handling unit. The air is forced by the pressure differential between the airspace and the low pressure interstitial volume to flow through openings in the sides of the boxes, circulate around the produce contained therein, and flow into the low pressure interstitial volume to be exhausted by the fans. In this manner, a forced air circulation flows throughout the produce load in the chamber. The temperature and flow rate of the air introduced into the chamber by the air handling unit can be varied to control the ripening rate of the produce.

OBJECTS AND SUMMARY OF THE INVENTION

One object of the present invention is to provide a ripening apparatus which does not require a fixed structure, but instead can be constructed from a transportable container so that ripening can be accomplished during transportation, or ripening can be accomplished without the need to construct an expensive structure or building. In addition, another object of the present invention is to produce a ripening apparatus that can be constructed inexpensively from an available transportable refrigerated container. A further object of the present invention is to provide a ripening apparatus which may be adjusted according to the number of pallets of fruit within the apparatus.

The apparatus of the present invention achieves temperature controlled airflow that maintains produce kept therein at generally uniform temperatures.

Another object of the invention is to provide a ripening room that, when either fully or partially loaded, will include airspaces that can be quickly and easily adjusted to form high and low pressure plena to facilitate air flow through the produce, and allow variable loading.

The ripening apparatus of the present invention can include an air control system for transferring air between the fruit, and controlling the temperature of the air. The apparatus is designed to provide airflow through the air control system and through openings in the produce boxes. The air control system forms a low pressure plenum and a high pressure plenum such that the pressure differential between the low and high pressure plena forces air to flow through the openings in produce boxes. The air control system also includes two air flow control units. The first air flow control unit directs air flow around a refrigeration unit, thereby cooling the air that passes through the produce. A second air flow control unit simply circulates air through the produce without cooling the air. As a result, cool air is passed through the produce, but the air flow control units are not required to pass all the air through a cooling system, and allowing the use of a standard ISO (International Standards Organization) container with a refrigeration unit, without modifications to the refrigeration unit. Test results have established that this apparatus holds the pulp temperature of produce so treated to within 0.50° to 1° of a desired, set point, temperature through a ripening cycle. Such performance is equivalent to prior art ripening rooms.

The ripening apparatus includes at least one movable partition that can be positioned at various locations along the length of the ripening apparatus to generally seal the high pressure plenum. The movable partition enables the low pressure plenum to be conveniently enclosed and properly sized when the ripening room is either fully or partially loaded.

The present invention can use a standard, refrigerated, ISO container for ripening produce. Such containers are abundant worldwide and can be purchased at low cost. A ripening apparatus may therefore be provided at low cost compared to current conventional ripening rooms, which require construction of a building. This is particularly important in emerging nations with insufficient capital and infrastructure to support the construction of a conventional ripening room structure. The present invention may be transportable, and can be powered by a standard diesel generator or through an electrical connection. As a result, fruit may be ripened inexpensively in any location in the world, and may also be ripened while in transport between locations.

The present invention preferably includes a refrigerated container, two forced air fans—one for moving air across the refrigeration coils and through the palletized boxes containing fruit, and the other to force air through the palletized boxes—a slide rail plated with a low friction polymer to allow pallets to slide into and out of the apparatus during loading and unloading, a shelf for sealing the slide rail to the wall of the container and for sealing the top of a movable partition which closes a low pressure plenum, and a steel guide rail for aligning and sealing the pallets on the floor of the apparatus.

In operation, one to ten pallets of fruit are loaded along the slide and guide rails so that they are sealed tightly against the rails and any adjacent pallet, and thereafter are slid into position in the apparatus. The movable partition is brought into alignment with the rear edge of the last pallet and sealed between that pallet and a side wall. The refrigeration unit and the fans are activated, thereby forcing refrigerated and unrefrigerated air through the boxes on the pallets. An ethylene gas generator and humidifier may also be activated.

BRIEF DESCRIPTION OF THE DRAWINGS

FIG. 4 is a perspective view of an embodiment of a movable partition of the ripening apparatus.

FIG. 7 is a front view of the movable partition shown in a closed position.

DETAILED DESCRIPTION OF THE INVENTION

Figure 1:
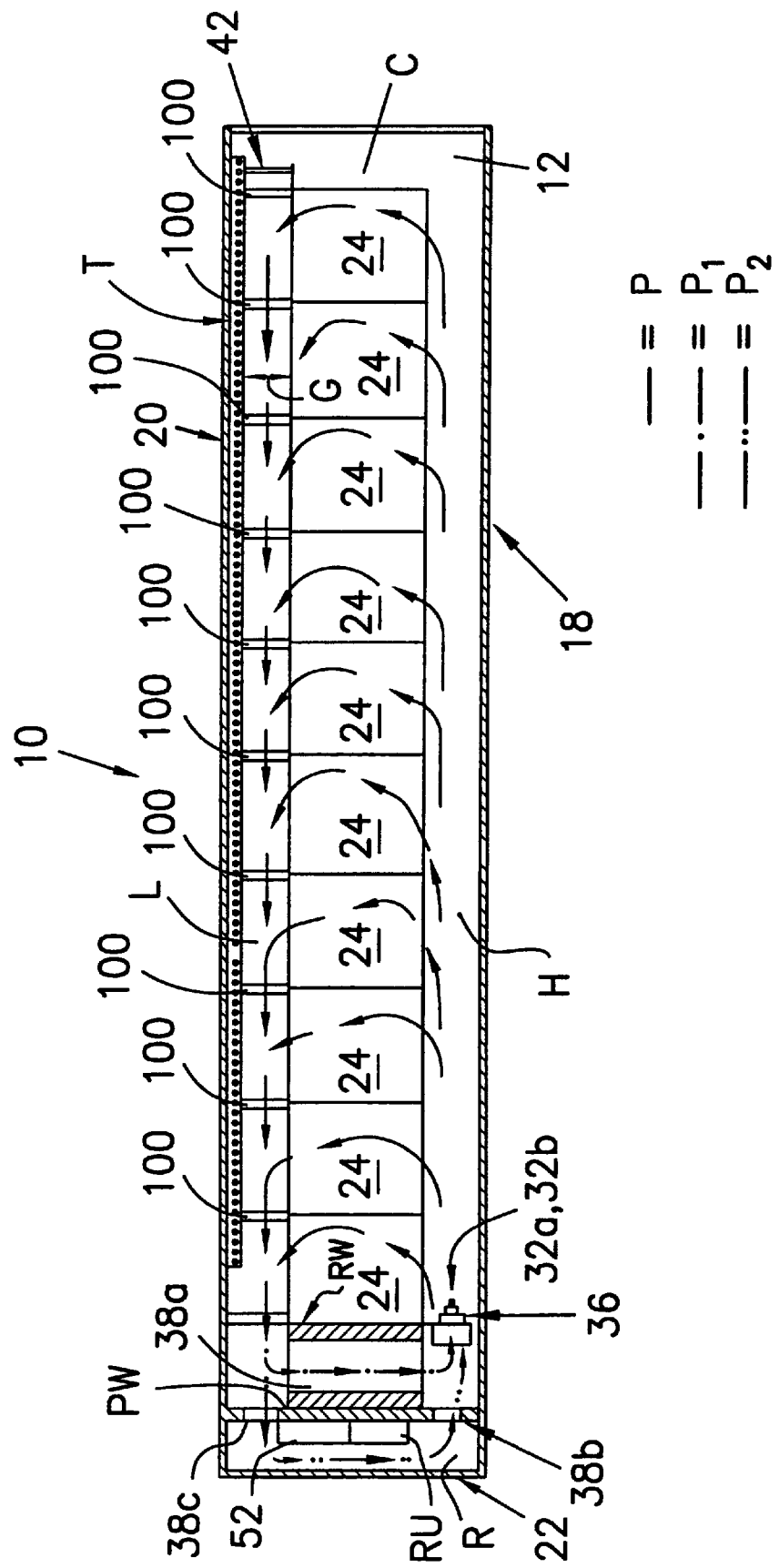
FIG. 1 is a top view of a ripening apparatus in accordance with the present invention with the roof being cut away.
Figure 2:
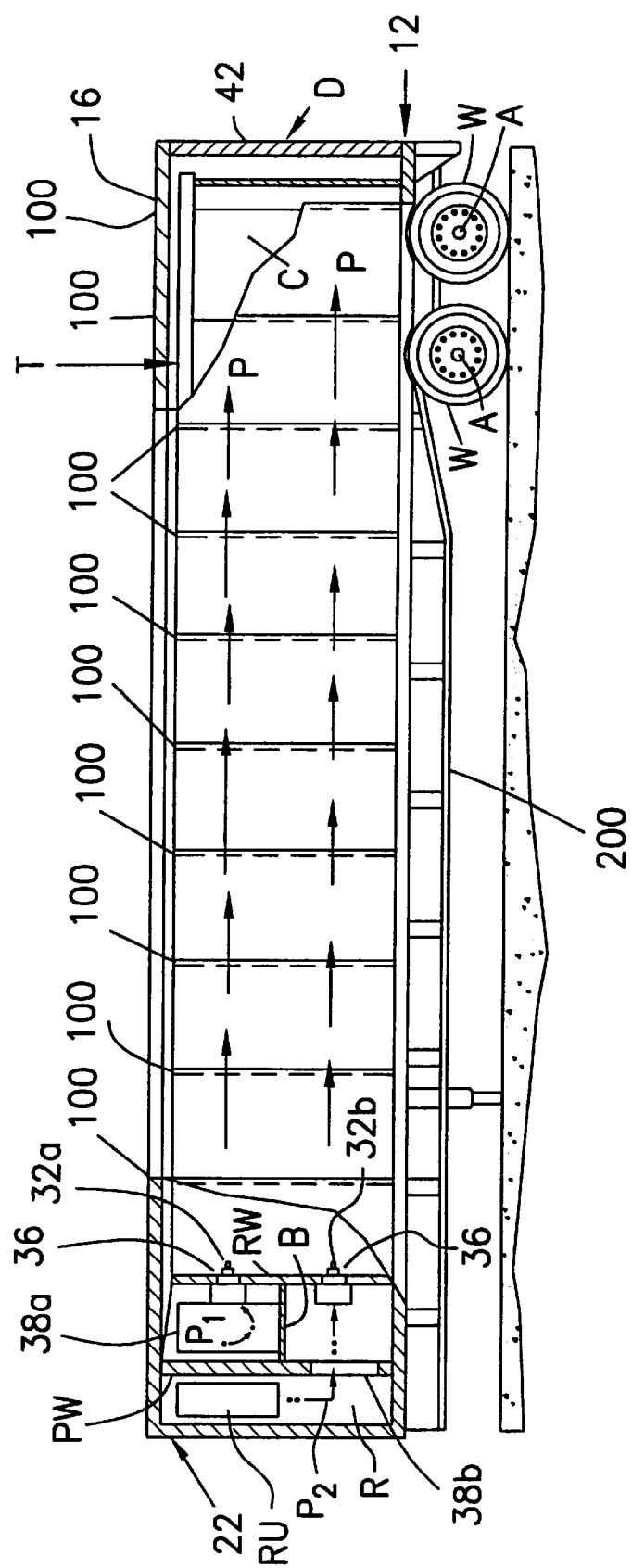
FIG. 2 is a side elevation view of the ripening apparatus with a portion of the sidewall being cut away.
Figure 3:
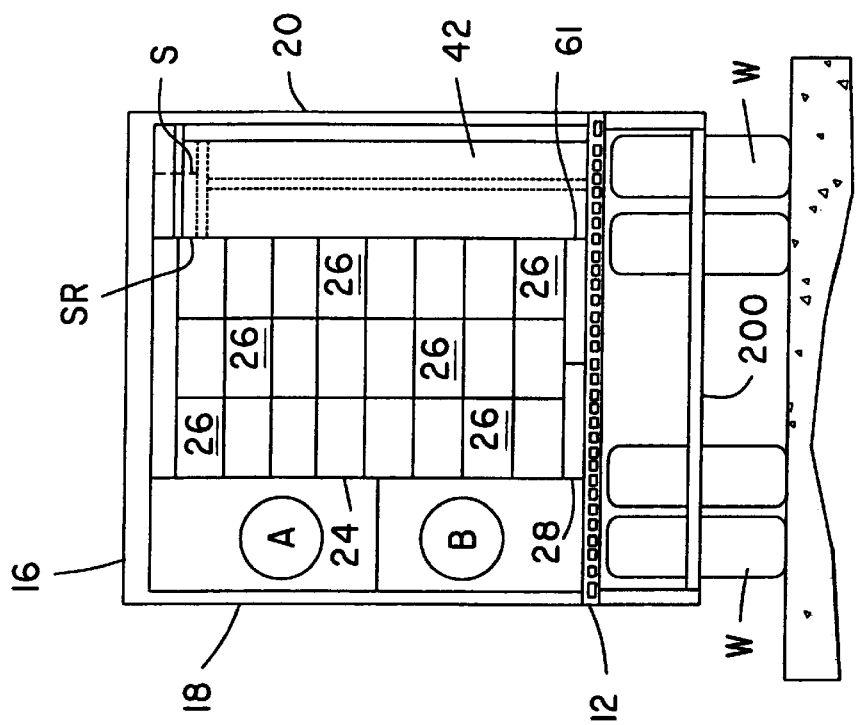
FIG. 3 is a rear elevation view of the ripening apparatus with the rear door opened.

A ripening apparatus 10 in accordance with the present invention (as shown in FIGS. 1, 2, and 3) includes a floor 12, a ceiling 16, two sidewalls 18, 20 and a front wall 22. The ripening apparatus 10 is constructed from a standard, refrigerated, 40-foot ISO (International Standards Organization) container which may be mounted on a chassis 200 which includes one or more axles A with wheels W. The container includes a retractable or swingable rear door or doors D. The floor, walls, door and ceiling 12, 16, 18, 20, 22 and D may be insulated and form a generally gas-tight chamber C for refrigerating and treating produce to control ripening of the produce as will be discussed below.

Produce is moved into and out of the ripening chamber C through the door D at the rear of the ripening apparatus on separate palletized loads 24. Each palletized load 24 includes a plurality of protective boxes 26 to unitize and protect the produce. The protective boxes 26 are block-stacked on pallets 28 for easy handling during their loading into and removal from the ripening apparatus 10. Each pallet 28 may be 40 inches by 48 inches with 48 protective boxes tightly block-stacked thereon. Each of the protective boxes 26 includes side openings (not shown), which correspond with similar openings in adjacent boxes 26 to facilitate airflow through the boxes 26. The apparatus 10 may include a slide rail SR, preferably formed of an L- or angle iron, plated with a low friction polymer to allow pallets 28 to slide into and out of the apparatus 10 during loading and unloading. A shelf S may seal the slide rail to the wall 20 and may seal the top of the partition 42. A steel guide rail GR, preferably formed of an L- or angle iron, extending along the length of the apparatus 10 at the floor 12 may be used for aligning and sealing the pallets 28 as they are loaded.

The ripening apparatus 10 in accordance with the invention can preferably be constructed from a transportable refrigerated ISO container structure conventionally used for transporting frozen or cold products. The ripening apparatus 10 shown in the drawings is of a size which may house (when fully loaded) one row of palletized produce containing 10 palletized loads. As will be discussed further below, the ripening apparatus 10 need not be fully loaded to be operational; it can be conveniently operated under a variety of partial loading conditions.

The ripening apparatus 10 is equipped with an air control system including two air flow control units 32a, 32b mounted on one side of the apparatus 10 near the front. The air flow control units 32a, 32b each include a high-volume (e.g., 4000 cfm) fan 36 for controlling airflow. A diesel or other powered generator (not shown) added to the apparatus 10 may be used to provide power to drive the fans, or the fans may be driven by a fixed source of electrical power. As an alternative, hydraulic motors (not shown) may be used to drive the fan. Hydraulic motors emit less heat and require less space than electric motors.

The fan 36 of air flow control unit 32a is positioned to provide air circulation to the palletized loads 24, between a high-pressure plenum H and a low pressure plenum L. The fan 36 of air flow control unit 32b is positioned to provide air circulation and refrigerated air flow to the palletized loads 24, between high-pressure plenum H and low-pressure plenum L. As shown in FIG. 2, a baffle B separates air flow control unit 32a from air flow control unit 32b, thereby providing separate air flow paths through each air flow control unit 32a, 32b. The air flow control units 32a, 32b are each connected to ducting or passages, as described in more detail below, allowing air to circulate through the palletized loads 24.

A circulation duct 38a defined by duct or passage RW leading from the air flow unit 32a connects the low pressure side of the fan 36 of air flow control unit 32a to the low-pressure plenum L, enabling air to flow along path $P_1$. Circulation passages 38b, 38c leading from the air flow control unit 32b connect the low-pressure plenum L to the proximity of a refrigeration unit RU, and then to the low pressure side of the fan 36 of air flow control unit 32b, to enable refrigerated air to flow along path $P_2$.

A movable side partition 42 extends along the height of one side of the chamber C, and can be moved to a position to bridge a gap G between sidewall 20 and a palletized load 24. The partition 42 extends downwardly from the ceiling 16, and is mounted for sliding movement along a rail R. The gap G forms a portion of a low pressure plenum L to facilitate air circulation in the chamber C, as described in more detail below.

The low-pressure plenum L is further enclosed by the outer sides of the palletized loads 24 placed in the ripening apparatus 10. The rear side of the rearmost palletized load 24 in the chamber C abuts the rear wall RW of the chamber C.

The low-pressure plenum L is defined by the partition 42, the outer sides of the palletized produce, the floor 12, the sidewall 20, the ceiling 16, and a partition wall PW. These boundaries all seal against one another to thereby create a relatively airtight plenum through which air may flow along flow path P.

In use, the fans 36 of the air flow control unit 32a, 32b operate to transfer air at controlled airflow rates between the high-pressure plenum H and the low-pressure plenum L along path P. The fans 36 withdraw air from the low-pressure plenum L through the duct 38a (unit 32a) or circulation passages 38b, 38c (unit 32b), and the air thus withdrawn into the high-pressure plenum H, thereby creating a lower pressure level in the low-pressure plenum, and a higher pressure level in the high pressure plenum. The pressure differential between the high pressure plenum H on one side of the containers 26 and the low pressure plenum L on the other side of the containers 26 causes air from the high-pressure plenum H to circulate through the openings in the protective boxes 26, around the produce contained therein, and into the low-pressure plenum L, to again be drawn by the fans 36. The movable partition 42, enclosing the low-pressure plenum L, enables substantially all of the forced airflow resulting from the pressure differential to flow through the openings of the protective boxes 26 and accordingly, around the produce contained in the boxes 26. Some of the air is withdrawn from low-pressure plenum L by air flow control unit 32a and passes through duct 38a to high-pressure plenum H without being cooled, while some of the air is withdrawn from low-pressure plenum L by air flow control unit 32b and passes through passages 38b, 38c to high-pressure plenum H after being cooled by refrigeration unit RU. The circulation and cooling of air, and thus the ripening process, may be accomplished while the apparatus 10 is being transported by any known method of transporting a standard ISO container, such as mounting on a chassis 200 with wheels.

The pressure differential is thus efficiently utilized to uniformly circulate air throughout the produce load. The forced air circulation enables the temperature of the produce to be controlled, through control of the airflow by the air flow control units 32a, 32b, and control of the temperature by the refrigeration unit RU. The forced air circulation also enables effective treatment of the produce by ethylene or other gases used to further control ripening. An ethylene generator and humidifier 52 may disperse ethylene gas and humidity into the chamber C at preselected times, as is known in the art. Although shown in a particular location in FIG. 1, it is to be understood that an ethylene generator and/or humidifier could be located at any position within the interior of the apparatus 10.

When the ripening apparatus 10 is only partially loaded, the partition 42 is moved to a lengthwise position 100 flush with the rear of the rear-most palletized load 24 in the chamber C.

FIGS. 4–7 illustrate in greater detail an embodiment of one of the movable partitions 42. It is to be understood that the embodiment of FIGS. 4–7 is an example, and that other designs of the partition are possible, including those shown in U.S. patent application Ser. No. 08/638,905 filed Apr. 24, 1996 now U.S. Pat. No. 5,789,007, issued Aug. 4, 1998 the disclosure of which is incorporated herein by reference. The movable partition 42 includes an elongated generally rigid panel 54. The outer sides of the panels 54 are fitted with flexible resilient strips or sealing flaps 56 that generally sealingly engage the sidewall 20 and produce boxes 26. The panel 54 preferably is made of aluminum, and the sealing flaps 56 preferably are made of neoprene gasket material.

Figure 5A:
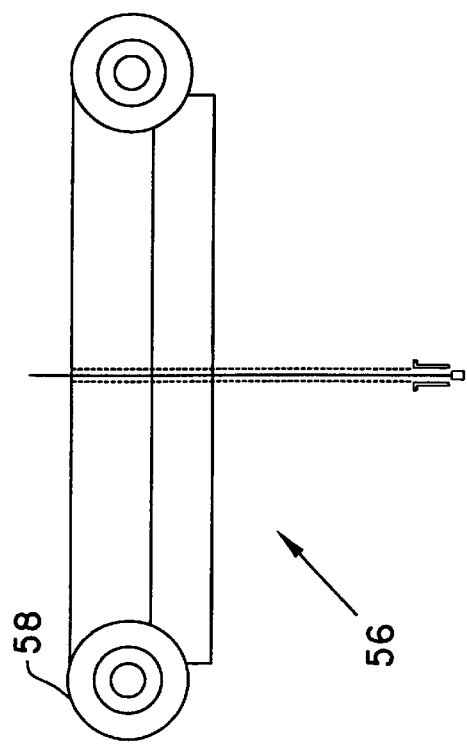
FIG. 5A is an enlarged side view of a wheel assembly of the movable partition of FIG. 4.
Figures 5B, 6:
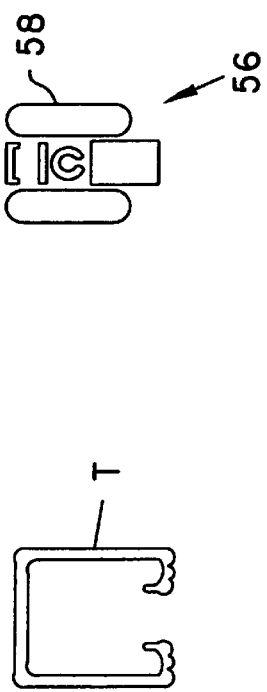
FIG. 5B is a front view of the wheel assembly of FIG. 5A
FIG. 6 is an enlarged front view of a railing in the ripening apparatus in which the wheel assembly is mounted.

The partition 42 includes a wheel assembly 56 (shown in greater detail in FIGS. 5A and 5B) rotatably attached to the upper end. The wheel assembly 56 includes four wheels 58 that are movable along the track 7 mounted on the ceiling 16 of the ripening apparatus 10. (A front view of the track 7 is shown in FIG. 6). The partition 42 can thereby be easily moved along the length of the ripening apparatus 10.

The partition 42 enables the rear end of the low-pressure plenum L to be quickly and easily enclosed when the ripening apparatus 10 is fully loaded or under a variety of partial loading conditions. The partition 42 is independently positionable at the outer edge of the frontmost palletized produce load 24, at positions 100, to enclose the low-pressure plenum L at any particular loading state of the apparatus 10.

The air flow system in accordance with the present invention is particularly suitable for the creation of a transportable ripening apparatus. The air flow system includes two circulation paths, each passing along the length of and through the loads 24 in the ripening apparatus 10. One of these circulation paths P, $P_1$, is only for the circulation of air, and another of the paths P, $P_2$, is for the circulation and refrigeration of air. The fan 36 of the airflow control unit 32a draws air from the low pressure plenum L, through duct 38a, and into the high-pressure plenum H, without refrigeration. The fan 36 of the airflow control unit 32b draws air from the low pressure plenum L, through passage 38b, in the proximity of refrigeration unit RU, through passage 38c, and into the high-pressure plenum H, thereby providing refrigerated air flow.

Partition wall PW, which is closed at the rear of airflow control unit 32a prevents air drawn by fan 36 of airflow control unit 32a from passing into refrigeration space R, and instead directs air along path $P_1$.

Although the present invention has been described in terms of specific embodiments, various changes and modifications may be suggested to one skilled in the art. The invention is intended to encompass such changes and modifications as fall within the scope of the appended claims.

I claim:

1. An apparatus for controlled ripening of produce, comprising:
   a chamber defined by a ceiling, a floor, and a plurality of walls connecting the ceiling and the floor, the chamber configured to receive a row of produce, the row being proximate and spaced apart from two of the walls to define two plena therebetween;
   a cooling unit;
   a first air flow control unit, the first air flow control unit including at least one fan, the first air flow control unit transferring air between the plena and proximate to the cooling unit, to thereby control a temperature of the air; and
   a second air flow control unit, the second air flow control unit including at least one fan, the second air flow control unit arranged for transferring air between the plena without passage through the cooling unit.

2. The apparatus of claim 1, wherein the produce is stored in protective boxes that are block stacked on pallets.

3. The apparatus of claim 2, wherein each of the protective boxes includes side openings to permit air circulation therethrough.

4. The apparatus of claim 1, further comprising a partition positioned between the produce and one of the walls for enclosing an end of one of the plena.

5. The apparatus of claim 4, wherein the partition is movable along a length of the chamber.

6. The apparatus of claim 4, wherein the partition comprises an elongated panel and resilient sealing flaps fitted at sides of the panel.

7. The apparatus of claim 6, wherein the panel comprises aluminum and the sealing flaps comprise neoprene gasket material.

8. The apparatus of claim 6, wherein the partition includes a wheel assembly movably mounted on a track extending along a length of the chamber.

9. The apparatus of claim 8, wherein the track is mounted on the ceiling.

10. The apparatus of claim 9, wherein the wheel assembly is rotatably connected to an upper end of the panel.

11. The apparatus of claim 1, further comprising an ethylene generator for introducing ethylene gas in the chamber.

12. The apparatus of claim 1, further comprising a duct connected to the second air flow control unit for transferring air between the second air flow control unit and one of the plena.

13. The apparatus of claim 1, further comprising a chassis comprising at least one set of wheels, an exterior of the floor being mounted on the chassis, the wheels allowing the apparatus to be transported.

14. The apparatus of claim 1, further comprising a low-friction slide rail mounted on the ceiling.

15. The apparatus of claim 1, further comprising a guide rail mounted on the floor.

16. A transportable apparatus for controlling the ripening of produce, comprising:
   a chamber defined by a plurality of walls for receiving a row of boxes containing the produce, the row of boxes being spaced apart from two of the walls and defining side airspaces therebetween;
   a chassis including at least one set of wheels, an exterior of the chamber being mounted on the chassis, the wheels allowing the apparatus to be transported; and
   an air control system, separate from said boxes, and arranged for transferring air directly from one of the side airspaces to the other of said airspaces without passage through said boxes, the air control system being housed inside the chamber.

17. A method for controlling the ripening of produce, the produce being stored in boxes arranged in a row in a chamber, the chamber being defined by a plurality of walls, the row of boxes being spaced apart from two of the walls thereby defining side airspaces therebetween, the side airspaces being generally sealed from each other to inhibit airflow therebetween except for airflow through openings in the boxes, the method comprising:
   (a) withdrawing air from one of the side airspaces, thereby forming a low pressure plenum therein;
   (b) cooling some of the air withdrawn from the low pressure plenum;
   (c) exhausting cooled, withdrawn air to another side airspace, thereby forming a high pressure plenum therein, and exhausting uncooled air withdrawn to the high pressure plenum, wherein air pressure differences between the high and low pressure plena cause air in the side airspaces to flow through the openings in the boxes.

18. The method of claim 17, wherein the steps of withdrawing air and exhausting air comprise withdrawing air and exhausting air using at least two fans.

19. The method of claim 17, further comprising the step of introducing ethylene gas in the chamber to further control ripening of the produce.

20. An apparatus for controlling the ripening of produce, comprising:
   a chamber defined by a plurality of walls for receiving a row of boxes containing the produce, the boxes comprising openings, the row of boxes being spaced apart from two of the walls and defining side airspaces therebetween;
   an air control system for transferring air between the side airspaces and controlling the temperature of the air, the air control system comprising a first air flow control unit and a second air flow control unit, the first air flow control unit operable for transferring and cooling air and the second air flow control unit operable transferring air without cooling; and
   a movable partition positioned between the produce and the walls, the movable partition enclosing an end of one of the side airspaces and sealing the side airspaces from one another to inhibit airflow between the airspaces except for airflow through the air control system and through openings in the boxes, such that when the air control system transfers air from the airspaces, a low pressure plenum is formed in one side airspace and a high pressure plenum is formed in another side airspace such that the pressure differential between the low and high pressure plena forces airflow between the side airspaces through the openings in the boxes.

21. The apparatus of claim 20, wherein the partition is movable along a length of the chamber.

22. The apparatus of claim 21, wherein the partition comprises an elongated panel and two resilient flaps fitted at sides of the panel.

23. The apparatus of claim 22, wherein the partition includes a wheel assembly movably mounted on a track extending along a length of the chamber.

24. The apparatus of claim 23, wherein the wheel assembly is rotatably connected to an upper end of the panel.

25. The apparatus of claim 24, further comprising a refrigeration unit.

26. The apparatus of claim 20, further comprising a duct connected to the second air flow control unit for transferring air between the second air flow control unit and the high pressure plenum.

27. The apparatus of claim 20, further comprising a chassis comprising at least one set of wheels, an exterior of the chamber being mounted on the chassis, the wheels allowing the apparatus to be transported.

28. The apparatus of claim 20, further comprising a lowfriction slide rail mounted on one of the walls.

29. The apparatus of claim 20, further comprising a guide rail mounted on one of the walls.

30. A method for simultaneously transporting and controlling the ripening of produce, the produce being arranged in a chamber, the method comprising:
   (a) withdrawing air from a first area adjacent the produce;
   (b) cooling some of the withdrawn air;
   (c) exhausting cooled, withdrawn air to a second area adjacent the produce, and exhausting uncooled, withdrawn air to the second area; and
   (d) simultaneous with the exhausting, transporting the produce.

31. A transportable apparatus for controlling the ripening of produce, comprising:
   a chamber defined by a plurality of walls for receiving a row of boxes containing the produce, the row of boxes being spaced apart from two of the walls and defining side airspaces therebetween;
   a chassis including at least one set of wheels, an exterior of the chamber being mounted on the chassis, the wheels allowing the apparatus to be transported, the chamber being formed by a standard ISO container; and
   an air control system, separation from said boxes, and arranged for transferring air.

* * * * *

UNITED STATES PATENT AND TRADEMARK OFFICE
CERTIFICATE OF CORRECTION

PATENT No. : 5,965,185

DATED : October 12, 1999

INVENTOR(S): Michael BIANCO

It is certified that error appears in the above-identified patent and that said Letters Patent is hereby corrected as shown below:

Column 7, line 33 change "said airspaces" to -- said side airspaces --

Column 7, line 50 change "uncooled air withdrawn" -- to uncooled, withdrawn air --

Column 8, line 64 change "separation" to -- separate --

Column 8, line 65 change "...air." to -- ...air directly from one of the side airspaces to the other of said side airspaces without passing through said boxes, the air control system being located within the chamber --

Signed and Sealed this

Second Day of January, 2001

*Attest:*

Q. TODD DICKINSON

*Attesting Officer*     *Commissioner of Patents and Trademarks*